US007881253B2

(12) United States Patent
Budampati et al.

(10) Patent No.: US 7,881,253 B2
(45) Date of Patent: Feb. 1, 2011

(54) APPARATUS AND METHOD SUPPORTING A REDUNDANCY-MANAGING INTERFACE BETWEEN WIRELESS AND WIRED NETWORKS

(75) Inventors: Ramakrishna S. Budampati, Maple Grove, MN (US); Patrick S. Gonia, Maplewood, MN (US); Alexander Chernoguzov, Warrington, PA (US)

(73) Assignee: Honeywell International Inc., Morristown, NJ (US)

( * ) Notice: Subject to any disclaimer, the term of this patent is extended or adjusted under 35 U.S.C. 154(b) by 788 days.

(21) Appl. No.: 11/888,090

(22) Filed: Jul. 31, 2007

(65) Prior Publication Data

US 2009/0034441 A1 Feb. 5, 2009

(51) Int. Cl.
*H04L 12/28* (2006.01)
*H04J 1/16* (2006.01)
*G08C 15/00* (2006.01)
*G06F 11/00* (2006.01)
*G01R 31/08* (2006.01)

(52) U.S. Cl. .............. 370/328; 370/254; 370/310; 370/238; 455/428; 709/226

(58) Field of Classification Search ......... 370/310–328, 370/338–342, 351–389, 238–254; 709/201–206, 709/223–246
See application file for complete search history.

(56) References Cited

U.S. PATENT DOCUMENTS

| 5,566,356 | A  | * | 10/1996 | Taketsugu | ...... 455/436 |
| 6,437,692 | B1 | * | 8/2002 | Petite et al. | ...... 340/540 |
| 6,751,219 | B1 | * | 6/2004 | Lipp et al. | ...... 370/390 |
| 7,190,961 | B2 | * | 3/2007 | Burr | ...... 455/502 |
| 7,366,114 | B2 | * | 4/2008 | Park et al. | ...... 370/256 |
| 7,440,735 | B2 | * | 10/2008 | Karschnia et al. | ...... 455/115.4 |
| 7,460,865 | B2 | * | 12/2008 | Nixon et al. | ...... 455/428 |
| 2004/0028023 | A1 | * | 2/2004 | Mandhyan et al. | ...... 370/351 |
| 2004/0029553 | A1 | * | 2/2004 | Cain | ...... 455/403 |

(Continued)

FOREIGN PATENT DOCUMENTS

WO    WO 01/35190 A2    5/2001

OTHER PUBLICATIONS

Taherian S et al, Event dissemination in Mobile Wireless Sensor Networks,IEEE Intl. Mobile Ad-Hoc and Sensor Systems, Oct. 2004, USA, pp. 573-575.

(Continued)

*Primary Examiner*—Man Phan
(74) *Attorney, Agent, or Firm*—Munck Carter, LLP

(57) ABSTRACT

A wireless network includes a leaf node, which generates a data message. The data message is routed through infrastructure nodes to a gateway infrastructure node, which is coupled to a wired network. A wireless interface module is also coupled to the wired network and communicates with the gateway infrastructure node. Multiple copies of the data message are created in the wireless network due to redundancy mechanisms supported in the wireless network, such as redundant connectivity and redundant message routing. The multiple copies of the data message are received at the gateway infrastructure node or the wireless interface module, which identifies the copies and communicates a single copy of the data message over the wired network to a destination. In this way, the redundancy mechanisms supported in the wireless network are concealed from wired components coupled to the wired network.

21 Claims, 11 Drawing Sheets

U.S. PATENT DOCUMENTS

| | | |
|---|---|---|
| 2005/0201349 A1 | 9/2005 | Budampati |
| 2005/0228509 A1* | 10/2005 | James .................... 700/19 |
| 2005/0281215 A1 | 12/2005 | Budampati et al. |
| 2006/0002368 A1 | 1/2006 | Budampati et al. |
| 2006/0171344 A1 | 8/2006 | Subramanian et al. |
| 2006/0171346 A1 | 8/2006 | Kolavennu et al. |
| 2006/0227729 A1 | 10/2006 | Budampati et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0067458 A1* | 3/2007 | Chand .................... 709/226 |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0103303 A1 | 5/2007 | Shoarinejad |
| 2007/0153677 A1 | 7/2007 | McLaughlin et al. |
| 2007/0153789 A1 | 7/2007 | Barker, Jr. et al. |
| 2007/0155423 A1 | 7/2007 | Carmody et al. |
| 2008/0273547 A1* | 11/2008 | Phinney .................... 370/437 |
| 2009/0086692 A1* | 4/2009 | Chen .................... 370/338 |

OTHER PUBLICATIONS

Thomas L. Phinney, "Apparatus and Method for Acknowledging Successful Transmissions in a Wireless Communication System," U.S. Appl. No. 11/799,171, filed May 1, 2007.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

* cited by examiner

APPARATUS AND METHOD SUPPORTING A REDUNDANCY-MANAGING INTERFACE BETWEEN WIRELESS AND WIRED NETWORKS

TECHNICAL FIELD

This disclosure relates generally to control systems and more specifically to an apparatus and method supporting a redundancy-managing interface between wireless and wired networks.

BACKGROUND

Processing facilities are often managed using industrial control and automation systems. Example processing facilities include chemical, pharmaceutical, paper, and petrochemical production plants. Among other operations, industrial control and automation systems typically interact with and control industrial equipment in the processing facilities, such as equipment used to produce chemical, pharmaceutical, paper, or petrochemical products.

Industrial control and automation systems routinely include wired components and wireless components. For example, an industrial control and automation system could include a wireless network of sensors that provide data to a wired controller. Due to the unreliable nature of wireless communications, redundant connectivity and redundant message routing have been proposed. These techniques can be used to increase the reliability and robustness of wireless communications in industrial control and automation systems. While wireless sensor networks supporting redundant connectivity and redundant message routing have been developed, there are often difficulties integrating these sensor networks into wired control systems.

SUMMARY

This disclosure provides an apparatus and method supporting a redundancy-managing interface between wireless and wired networks.

In a first embodiment, a method includes receiving a plurality of data messages, where the data messages are transmitted over multiple paths in a wireless network. The method also includes determining if two or more of the data messages are copies. The method further includes, when two or more of the data messages are copies, communicating a single one of the two or more data messages over a wired network.

In particular embodiments, the method also includes receiving a second data message and communicating multiple copies of the second data message for transmission over the wireless network to a single destination.

In other particular embodiments, the wireless network includes gateway infrastructure nodes and wireless interface modules. The gateway infrastructure nodes receive the data messages directly or indirectly from one or more leaf nodes. The wireless interface modules receive the data messages from the gateway infrastructure nodes. The gateway infrastructure nodes and the wireless interface modules are coupled to the wired network.

In yet other particular embodiments, the receiving, determining, and communicating steps are performed by at least one of the wireless interface modules. For example, at each of the wireless interface modules, data messages may be received from multiple ones of the gateway infrastructure nodes. Also, the single one of the two or more data messages is communicated over the wired network by one of the wireless interface modules.

In still other particular embodiments, the receiving, determining, and communicating steps are performed by at least one of the gateway infrastructure nodes. For example, at a first of the gateway infrastructure nodes, the data messages may be received from one of the leaf nodes and a second of the gateway infrastructure nodes. Also, the single one of the two or more data messages is communicated over the wired network by the first gateway infrastructure node.

In a second embodiment, an apparatus includes at least one interface configured to communicate over a wired network. The apparatus also includes a controller configured to receive a plurality of data messages that are transmitted over multiple paths in a wireless network and determine if two or more of the data messages are copies. The controller is also configured to, when two or more of the data messages are copies, provide a single one of two or more data messages to the at least one interface for transmission over the wired network.

In a third embodiment, a computer program is embodied on a computer readable medium. The computer program includes computer readable program code for receiving a plurality of data messages, where the data messages are transmitted over multiple paths in a wireless network. The computer program also includes computer readable program code for determining if two or more of the data messages are copies. In addition, the computer program includes computer readable program code for, when two or more of the data messages are copies, communicating a single one of the two or more data messages over a wired network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
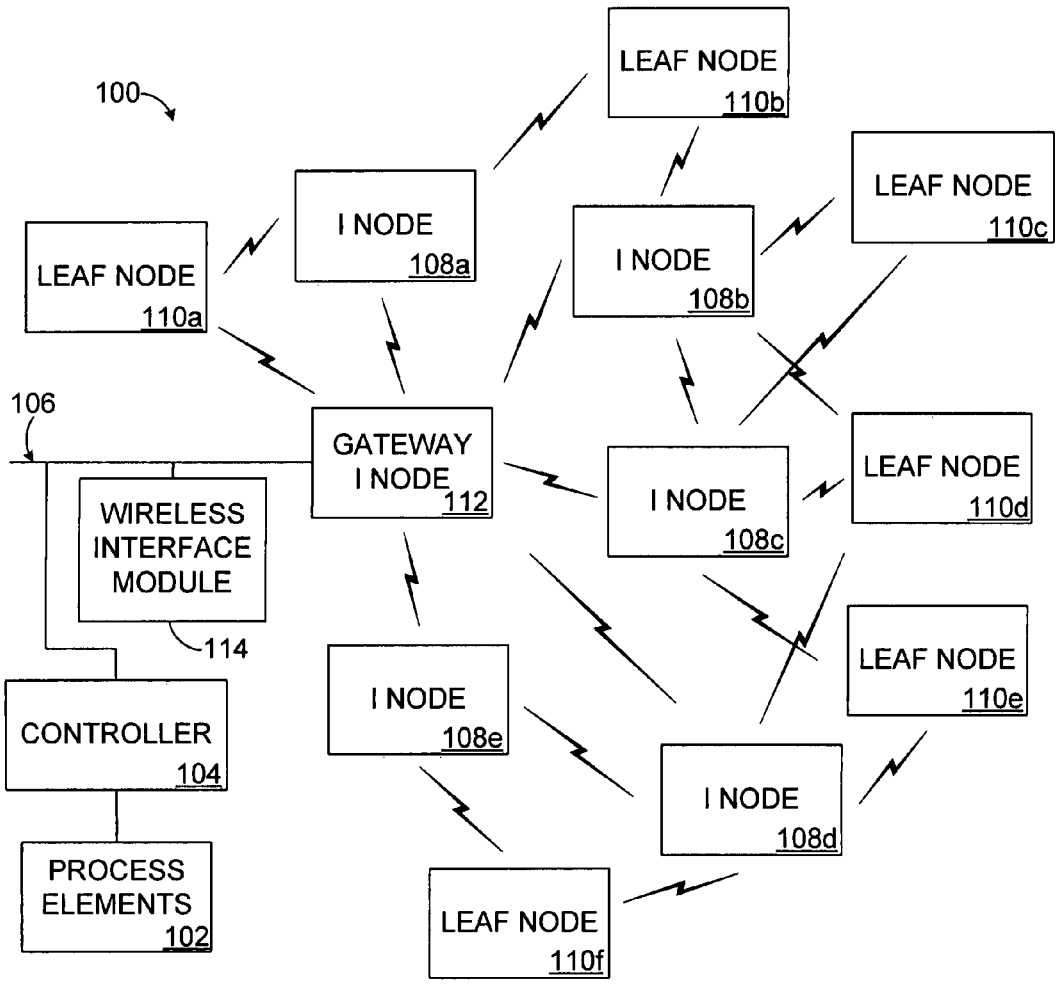
FIG. 1 illustrates an example industrial control and automation system according to this disclosure.

FIG. 1 illustrates an example industrial control and automation system 100 according to this disclosure. The embodiment of the industrial control and automation system 100 shown in FIG. 1 is for illustration only. Other embodiments of the industrial control and automation system 100 may be used without departing from the scope of this disclosure.

In this example embodiment, the industrial control and automation system 100 includes one or more process elements 102. The process elements 102 represent components in a process or production system that may perform any of a wide variety of functions. For example, the process elements 102 could represent valves, pumps, or any other or additional industrial equipment in a processing environment. Each of the process elements 102 includes any suitable structure for performing one or more functions in a processing or production system.

A controller 104 is coupled to the process elements 102. The controller 104 controls the operation of one or more of the process elements 102. For example, the controller 104 could provide control signals to one or more of the process elements 102, thereby adjusting the operation of those process elements 102. The controller 104 could also receive information associated with the system 100, such as by receiving sensor measurements of a flow rate of material through a pipe. The controller 104 could use this data to control one or more of the process elements 102, such as by controlling a valve using the measured flow rate. The controller 104 includes any hardware, software, firmware, or combination thereof for controlling one or more process elements 102. The controller 104 could, for example, represent a computing device executing a MICROSOFT WINDOWS operating system.

A network 106 couples the controller 104 to other components in the industrial control and automation system 100. The network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the industrial control and automation system 100 also includes one or more wireless networks for communicating with wireless sensors or other wireless devices. In this example, a wireless network is formed using infrastructure nodes ("I nodes") 108a-108e, leaf nodes 110a-110f, and a gateway infrastructure node 112.

The infrastructure nodes 108a-108e and the leaf nodes 110a-110f engage in wireless communications with each other. For example, the infrastructure nodes 108a-108e may receive data transmitted over the network 106 (via the gateway infrastructure node 112) and wirelessly communicate the data to the leaf nodes 110a-110f. Similarly, the leaf nodes 110a-110f may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e and 110a-110f form a wireless network capable of providing wireless coverage to a specified area, such as in a large industrial complex.

In this example, the nodes 108a-108e and 110a-110f are divided into infrastructure nodes and leaf nodes. The infrastructure nodes 108a-108e typically represent line-powered devices, meaning these nodes receive operating power from an external source. As a result, these nodes 108a-108e are typically not limited in their operations since they need not minimize power consumption to increase the operational life of their internal power supplies. On the other hand, the leaf nodes 110a-110f typically represent battery-powered devices, meaning these nodes receive operating power from internal batteries or other power supplies. Because of this, these nodes 110a-110f are often more limited in their operations in order to help preserve the operational life of their internal power supplies.

Each of the nodes 108a-108e and 110a-110f includes any suitable structure facilitating wireless communications. Each of the nodes 108a-108e and 110a-110f could also include other functionality, such as functionality for generating or using data communicated over the wireless network. For example, the leaf nodes 110a-110f could represent wireless sensors in an industrial facility, where the leaf nodes are used to measure various characteristics within the facility. These sensors could collect sensor readings and communicate the sensor readings to the controller 104 via the gateway infrastructure node 112. The leaf nodes 110a-110f could also represent actuators that can receive control signals from the controller 104 and adjust the operation of the industrial facility. In this way, the leaf nodes 110a-110f may include or operate in a similar manner as the process elements 102 that are physically connected to the controller 104.

The gateway infrastructure node 112 communicates wirelessly with, transmits data to, and receives data from one or more infrastructure nodes 108a-108e and possibly one or more leaf nodes 110a-110f. The gateway infrastructure node 112 also converts data between the protocol(s) used by the network 106 and the protocol(s) used by the nodes 108a-108e and 110a-110f. For example, the gateway infrastructure node 112 could convert Ethernet-formatted data (transported over the network 106) into a wireless protocol format (such as the IEEE 802.11a, 802.11b, 802.11g, 802.11n, 802.15.3, 802.15.4, or 802.16 protocol format) used by the nodes 108a-108e and 110a-110f. The gateway infrastructure node 112 could also convert data received from one or more of the nodes 108a-108e and 110a-110f into Ethernet-formatted data for transmission over the network 106. In addition, the gateway infrastructure node 112 supports various functions, such as network creation and security, used to create and maintain a wireless network. The gateway infrastructure node 112 includes any suitable structure for facilitating communication between components or networks using different protocols.

In this example, the industrial control and automation system 100 further includes a wireless interface module 114. The wireless interface module 114 communicates with the gateway infrastructure node 112, helping to facilitate the use of the wireless network in the industrial control and automation system 100. For example, various wired components in the industrial control and automation system 100 could transmit data to the wireless interface module 114, which could then provide the data to the appropriate gateway infrastructure node 112 for communication to a specified leaf node. The gateway infrastructure node 112 could also provide data received from a leaf node to the wireless interface module 114, which could then provide the data to the appropriate wired destination. The wireless interface module 114 includes any hardware, software, firmware, or combination thereof for supporting the use of a wireless network in an industrial control and automation system. Although shown as separate from the gateway infrastructure node 112, the wireless interface module 114 could be combined with the gateway infrastructure node 112 in a single physical device.

In one aspect of operation, the wired or wireless network in the industrial control and automation system 100 could support various redundancy mechanisms, such as redundant connectivity and redundant message routing. For example, each leaf node 110a-110f could communicate a data message to multiple infrastructure nodes (108a-108e and 112). This typically leads to the creation of multiple copies of a single data message, such as copies of the data message received by multiple infrastructure nodes.

The wireless interface module 114 or the gateway infrastructure node 112 supports various functions that allow the wired and wireless systems in the industrial control and automation system 100 to support redundant communications. For example, the wireless interface module 114 or the gateway infrastructure node 112 could hide the redundancy mechanisms present in the wireless system from the wired system and vice versa. As a particular example, multiple copies of the same data message from a leaf node 110a-110f could be received by multiple gateway infrastructure nodes 112 (via one or more infrastructure nodes 108a-108e) and provided to the wireless interface module 114. The wireless interface module 114 could recognize the copies of the data message and forward a single copy of the data message to a wired destination. In this way, the various redundancy mechanisms in the wireless network can be hidden or concealed from the wired network. This may help to facilitate the wireless network's integration into the industrial control and automation system 100 by allowing the redundant connectivity and redundant message routing in the wireless network to remain transparent from the perspective of the wired network. Moreover, the wireless interface module 114 or the gateway infrastructure node 112 can provide this redundancy management in a secure manner. This may help to reduce or eliminate security holes in the industrial control and automation system 100, which could otherwise be caused by incorporating the wireless network into the industrial control and automation system 100.

Although FIG. 1 illustrates one example of an industrial control and automation system 100, various changes may be made to FIG. 1. For example, the industrial control and automation system 100 could include any number of process elements, controllers, networks, infrastructure nodes (gateway or other), leaf nodes, and wireless interface modules. Also, the functional division shown in FIG. 1 is for illustration only. Various components in FIG. 1 could be combined or omitted and additional components could be added according to particular needs. Further, while described as supporting a wireless network, the industrial control and automation system 100 could support any number of wireless networks. Beyond that, the communication paths and system layout in FIG. 1 are for illustration only and can be changed depending on the implementation. As a particular example, the leaf nodes 110a-110f in FIG. 1 could communicate with each other or with other arrangements of infrastructure nodes 108a-108e. In addition, FIG. 1 illustrates one operational environment in which a redundancy-concealing mechanism can be used. This functionality could be used in any suitable industrial control and automation or non-industrial control and automation system or environment.

Figure 2:
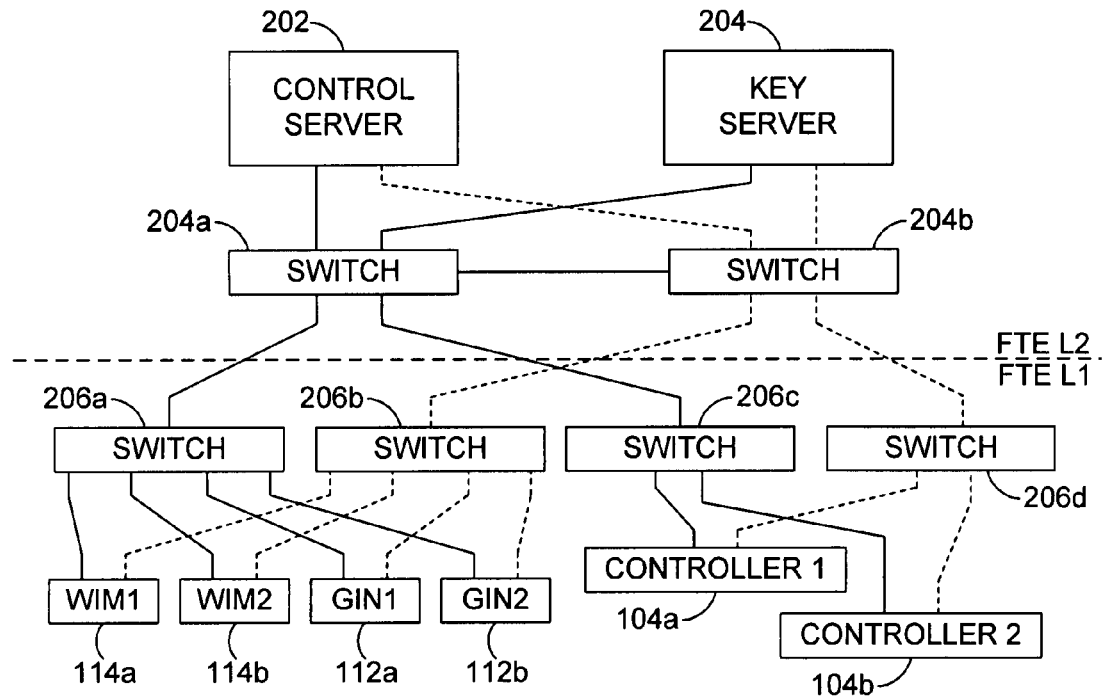
FIG. 2 illustrates additional details of an example industrial control and automation system according to this disclosure.

FIG. 2 illustrates additional details of an example industrial control and automation system 100 according to this disclosure. In particular, FIG. 2 illustrates a portion of a specific embodiment of the industrial control and automation system 100 that supports wireless and wired network redundancy concealment. The details shown in FIG. 2 are for illustration only. Other embodiments of the industrial control and automation system 100 may be used without departing from the scope of this disclosure.

As shown in FIG. 2, the industrial control and automation system 100 can include multiple controllers 104a-104b, multiple gateway infrastructure nodes (GINs) 112a-112b, and multiple wireless interface modules (WIMs) 114a-114b. The industrial control and automation system 100 also includes various servers 202-204 supporting higher-level functions. For example, a control server 202 may perform various functions to support the operation and control of the controllers 104a-104b. As particular examples, the control server 202 could log information collected or generated by the controllers 104a-104b, execute applications that control the operation of the controllers 104a-104b, and provide secure access to the controllers 104a-104b. The control server 202 includes any hardware, software, firmware, or combination thereof for providing access to or control of the controllers 104a-104b.

A key server 204 supports security in the industrial control and automation system 100. For example, the key server 204 could distribute cryptographic keys or other security data to various components in the industrial control and automation system 100, such as to the nodes 108a-108e, 110a-110f, and 112a-112b. The key server 204 includes any hardware, software, firmware, or combination thereof for providing cryptographic keys or other security information to various nodes in the industrial control and automation system 100.

In this example, the various components shown in FIG. 2 are coupled together by a Fault Tolerant Ethernet (FTE) network, which includes various switches 204a-204b and 206a-206d. In this embodiment, the FTE network represents a pair of redundant Ethernet network, where solid lines represent the paths in one network and dashed lines represent the paths in another network. The switches 204a-204b represent switches in a higher level (denoted L2) of the FTE network and are used to redundantly couple the servers 202-204 to the switches 206a-206d. The switches 204a-204b are also cross-connected to each other. The switches 206a-206d represent switches in a lower level (denoted L1) of the FTE network and are used to redundantly couple the controllers 104a-104b, gateway infrastructure nodes 112a-112b, and wireless interface modules 114a-114b to the switches 204a-204b. In this type of FTE network, four redundant paths typically exist between any two end points wishing to communicate.

While the use of an FTE network in the industrial control and automation system 100 has been illustrated, the industrial control and automation system 100 could support any other suitable type of network. For example, the industrial control and automation system 100 could support dual Ethernet networks (where the switches 204a-204b are not cross-connected), which typically provide two redundant paths between any two end points wishing to communicate.

In particular embodiments, the gateway infrastructure nodes 112a-112b and the wireless interface modules 114a-114b communicate within FTE L1 using the User Datagram Protocol (UDP) or the Transmission Control Protocol (TCP). Also, the gateway infrastructure nodes 112a-112b may receive their network addresses (such as Internet Protocol or "IP" addresses) using a Bootstrap Protocol. A single or redundant pair of wireless interface modules 114a-114b can communicate with one or multiple gateway infrastructure nodes 112a-112b, and more than two gateway infrastructure nodes 112a-112b could be used to provide higher levels of redundancy. An association of a specific gateway infrastructure node 112a-112b with a specific wireless interface module 114a-114b could be configured by a user, such as by informing the wireless interface module of its gateway infrastructure node or vice versa. The gateway infrastructure nodes 112a-112b may provide a communication path for communications with the key server 204, so a security relay in the wireless interface modules 114a-114b may not be needed. Redundant pairs of wireless interface modules 114a-114b could be co-located (such as in a single equipment cabinet) and could use private redundancy paths (such as those used with Fieldbus Interface Modules). A redundant pair of wireless interface modules 114a-114b and an associated pair of gateway infrastructure nodes 112a-112b could occupy four ports of a switch, allowing two sets of these components to be used with a single eight-port switch 206a-206b. In addition, the controllers 104a-104b (which could represent C300 controllers from HONEYWELL INTERNATIONAL INC.) may or may not be coupled to the same switch as the wireless interface modules 114a-114b and gateway infrastructure nodes 112a-112b.

In one aspect of operation, the gateway infrastructure nodes 112a-112b and other components in the wireless network can support redundant connectivity and redundant message routing to communicate with the leaf nodes 110a-110f. In these embodiments, the gateway infrastructure nodes 112a-112b and/or the wireless interface modules 114a-114b can perform various functions to hide or conceal the redundancy functions of the wireless network from components in the wired network (such as the servers 202-204). Additional details regarding this functionality are provided below.

Although FIG. 2 illustrates additional details of a specific embodiment of the industrial control and automation system 100, various changes may be made to FIG. 2. For example, any suitable type of network could be used to couple the various components shown in FIG. 2. Also, the industrial control and automation system 100 could include any suitable number of each of the components shown in FIG. 2.

Figure 3:
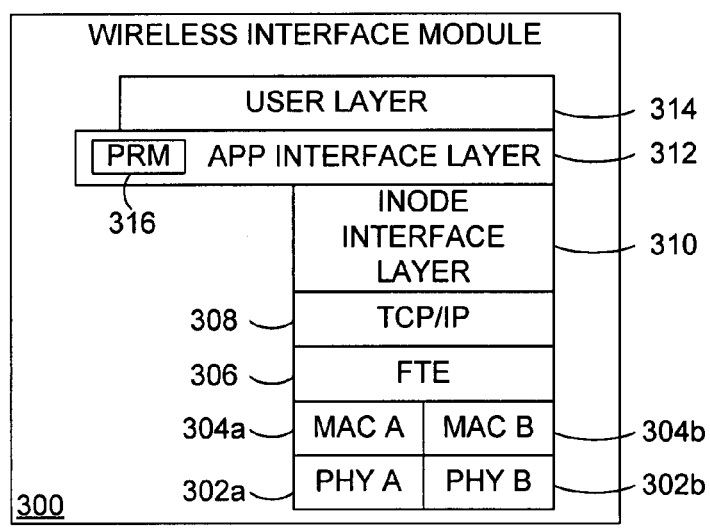
FIG. 3 illustrates an example wireless interface module in an industrial control and automation system according to this disclosure.

FIG. 3 illustrates an example wireless interface module in an industrial control and automation system according to this disclosure. In particular, FIG. 3 illustrates an example protocol stack 300 supported by the wireless interface modules 114. The protocol stack 300 shown in FIG. 3 is for illustration only. Other embodiments of the protocol stack 300 could be used in the wireless interface module 114 without departing from the scope of this disclosure.

In this example, the protocol stack 300 includes two physical layers 302a-302b, two Medium Access Control (MAC) layers 304a-304b, and a Fault Tolerant Ethernet (FTE) layer 306. The physical layers 302a-302b and the MAC layers 304a-304b support communications over two communication networks, such as two Ethernet networks forming an FTE network. The FTE layer 306 provides support for the use of a fault tolerant network, such as by supporting the routing of information over one Ethernet network when another Ethernet network fails. A TCP/IP layer 308 supports the use of TCP over IP as the link layer in the protocol stack 300.

The protocol stack 300 also includes an infrastructure node interface layer 310. The interface layer 310 supports various functions that allow the wireless interface module 114 to interface and interact with a gateway infrastructure node 112. The protocol stack 300 further includes an application interface layer 312 and a user layer 314. The application interface layer 312 provides an interface for applications executed on the wireless interface module 114. The user layer 314 provides support for various user-level functions and applications.

In this example, the application interface layer 312 includes a path redundancy manager (PRM) 316. The path redundancy manager 316 supports functions used to help conceal the redundancy mechanisms supported in a wireless network from a wired network. For example, the path redundancy manager 316 could receive multiple copies of a data message transmitted from a leaf node 110a-110f to multiple infrastructure nodes 108a-108e, which pass the copies of the data message to the gateway infrastructure node 112. The gateway infrastructure node 112 passes the copies of the data message to the wireless interface module 114, and the path redundancy manager 316 in the wireless interface module 114 identifies the copies of the data message. The path redundancy manager 316 can then forward a single copy of the data message to a suitable wired destination, such as by transmitting the data message over the network 106.

Similarly, the path redundancy manager 316 could receive a data message to be transmitted to a leaf node 110a-110f through multiple infrastructure nodes 108a-108e. The path redundancy manager 316 can then send multiple copies of the data message to multiple gateway infrastructure nodes 112a-112b, which pass the copies of the data message to the intended leaf node through the multiple infrastructure nodes 108a-108e.

In this way, the path redundancy manager 316 helps to support the redundancy mechanisms used in the wireless network while concealing the redundancy mechanisms from the wired network. In other words, the path redundancy manager 316 helps to make the redundancy mechanisms used in the wireless network transparent from the perspective of wired components in the industrial control and automation system 100. The path redundancy manager 316 includes any hardware, software, firmware, or combination thereof for hiding one or more redundancy mechanisms in one network from another network.

Figure 4:
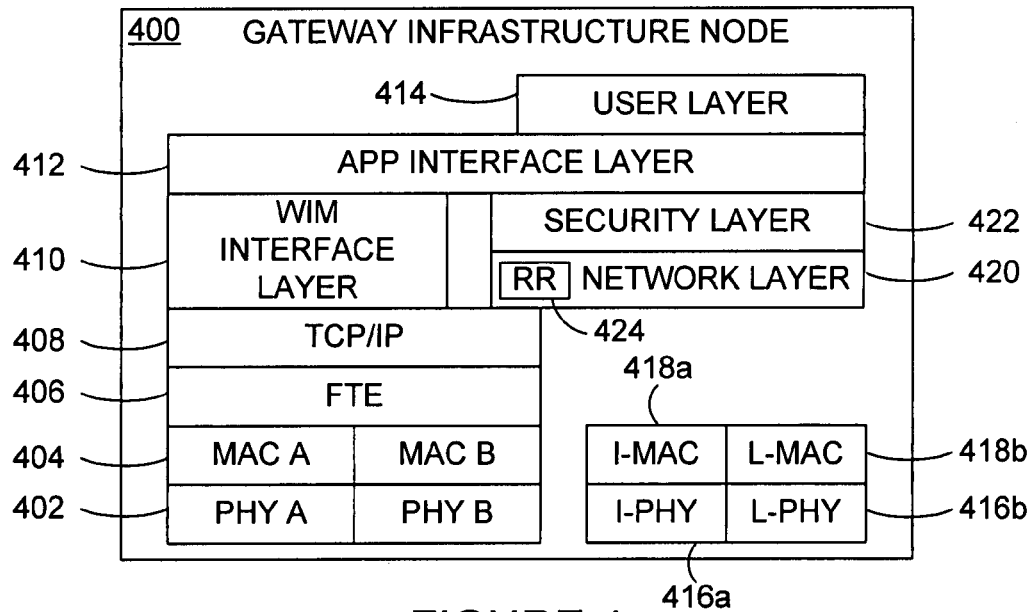
FIG. 4 illustrates an example gateway infrastructure node in an industrial control and automation system according to this disclosure.

FIG. 4 illustrates an example gateway infrastructure node in an industrial control and automation system according to this disclosure. In particular, FIG. 4 illustrates an example protocol stack 400 supported by the gateway infrastructure node 112. The protocol stack 400 shown in FIG. 4 is for illustration only. Other embodiments of the protocol stack 400 could be used in the gateway infrastructure node 112 without departing from the scope of this disclosure.

In this example, the protocol stack 400 includes two physical layers 402, two MAC layers 404, an FTE layer 406, and a TCP/IP layer 408. These layers may be the same as or similar to the corresponding layers in FIG. 3. In particular, these layers may support TCP/IP communications over a Fault Tolerant Ethernet network. The protocol stack 400 also includes a wireless interface module (WIM) interface layer 410, an application interface layer 412, and a user layer 414. The WIM interface layer 410 supports various functions that allow the gateway infrastructure node 112 to interface and interact with a wireless interface module 114. The application interface layer 412 and the user layer 414 may be the same as or similar to the corresponding layers in FIG. 3.

The various layers 402-408 in the protocol stack 400 facilitate communication over a wired FTE network, such as the network 106. The protocol stack 400 further includes various layers that support communications over a wireless network, such as communications between the gateway infrastructure node 112 and one or more infrastructure nodes 108a-108e or leaf nodes 110a-110f. For example, the protocol stack 400 includes two additional physical layers 416a-416b and two additional MAC layers 418a-418b. The physical layer 416a and MAC layer 418a support wireless communications with infrastructure nodes, such as by providing an interface to a wireless transceiver for communicating with the infrastructure nodes 108a-108e. Similarly, the physical layer 416b and MAC layer 418b support wireless communications with leaf nodes, such as by providing an interface to another wireless transceiver for communicating with the leaf nodes 110a-110f.

The protocol stack 400 also includes a wireless network layer 420 and a security layer 422. The wireless network layer 420 provides various functions for supporting the creation and use of a wireless network, such as routing, forwarding, and error handling functions. The security layer 422 supports various security-related functions associated with the wireless network, such as encryption and authentication.

In this example, the network layer 420 includes a redundancy resolver (RR) 424. The redundancy resolver 424 supports functions used to help conceal the redundancy mechanisms supported in a wireless network. For example, the redundancy resolver 424 in one gateway infrastructure node 112a could receive multiple copies of a data message transmitted from a leaf node to multiple infrastructure nodes 108a-108e, which pass the copies of the data message to multiple gateway infrastructure nodes 112a-112b (one of which passes the data message to the other). The redundancy resolver 424 identifies the copies of the data message and forwards a single copy of the data message to a wireless interface module 114.

Similarly, the redundancy resolver 424 could receive a data message to be transmitted to a leaf node. The redundancy resolver 424 can send one copy of the data message to the lower layers 416a-416b and 418a-418b of the gateway infrastructure node 112a for transmission to the leaf node (possibly via an infrastructure node). The redundancy resolver 424 can also send another copy of the data message to another gateway infrastructure node 112b for transmission to the leaf node (possibly via an infrastructure node).

In this way, the redundancy resolver 424 helps to support the redundancy mechanisms used in the wireless network while concealing the redundancy mechanisms from the wired network. The redundancy resolver 424 includes any hardware, software, firmware, or combination thereof for hiding one or more redundancy mechanisms in one network from another network.

Although FIGS. 3 and 4 illustrate examples of protocol stacks 300 and 400 used in a wireless interface module 114 and a gateway infrastructure node 112 in an industrial control and automation system, various changes may be made to FIGS. 3 and 4. For example, other or additional layers could be used in each of the protocol stacks 300 and 400. Also, FIGS. 3 and 4 illustrate different mechanisms (a path redundancy manager 316 in the wireless interface module 114 and a redundancy resolver 424 in a gateway infrastructure node 112) that can be used to conceal redundancy in a wireless network. An industrial control and automation system could include one or both of these mechanisms. Further, the path redundancy manager 316 and the redundancy resolver 424 could also conceal redundancy mechanisms in a wired network from a wireless network. For instance, the path redundancy manager 316 or the redundancy resolver 424 could receive multiple copies of a single data message from the wired network and forward a single copy to the wireless network. In addition, the locations of the path redundancy manager 316 in the wireless interface module 114 and the redundancy resolver 424 in a gateway infrastructure node 112 are for illustration only. These components could be used in other layers of the protocol stacks 300 and 400. As a particular example, the redundancy resolver 424 in the protocol stack 400 could be moved into the user layer 414 of the gateway infrastructure node 112, where it could function as a redundancy relay for relaying messages between the layers associated with the wireless network and the layers associated with the wired network.

Figure 5:
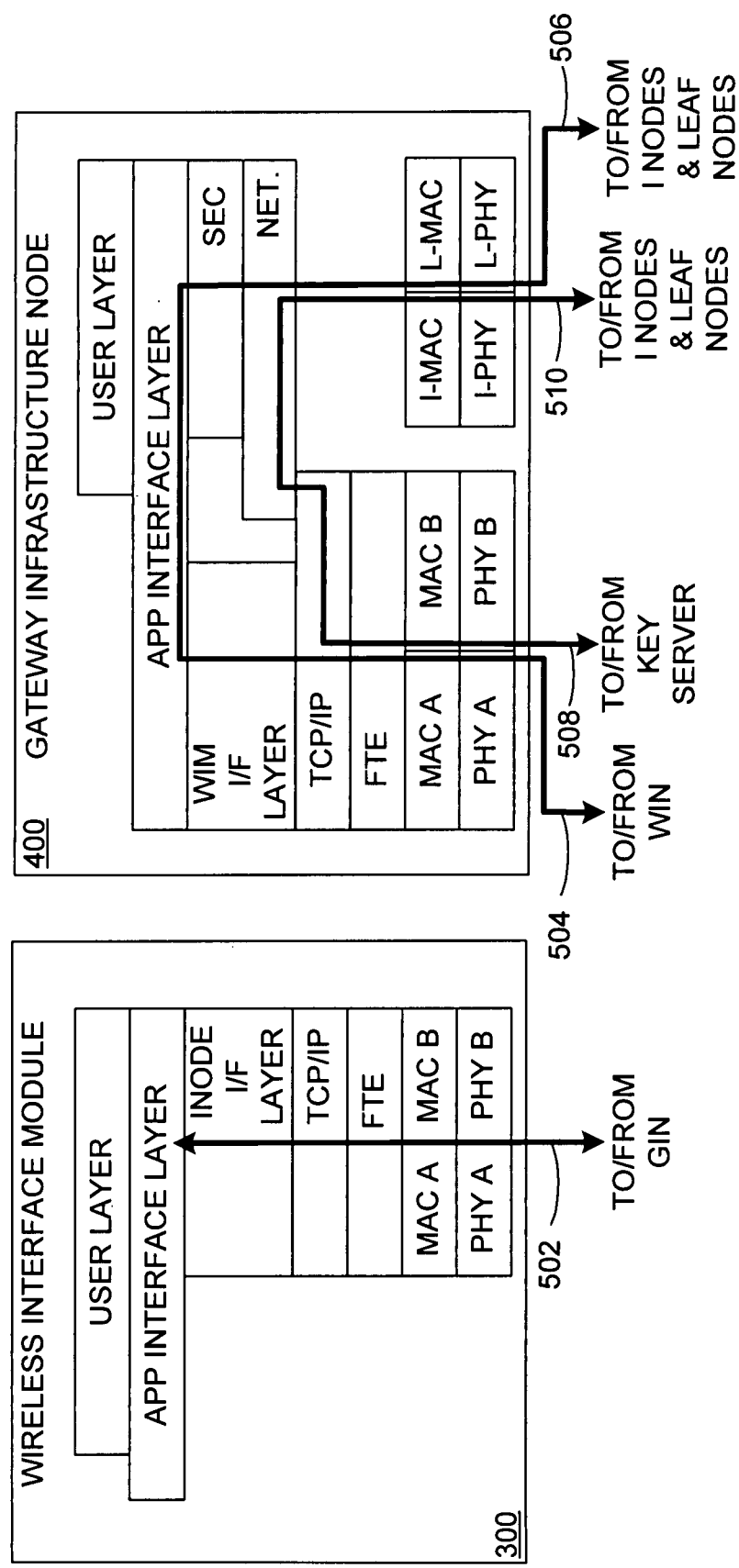
FIGS. 5 through 11 illustrate example communications in an industrial control and automation system according to this disclosure.
Figure 9:
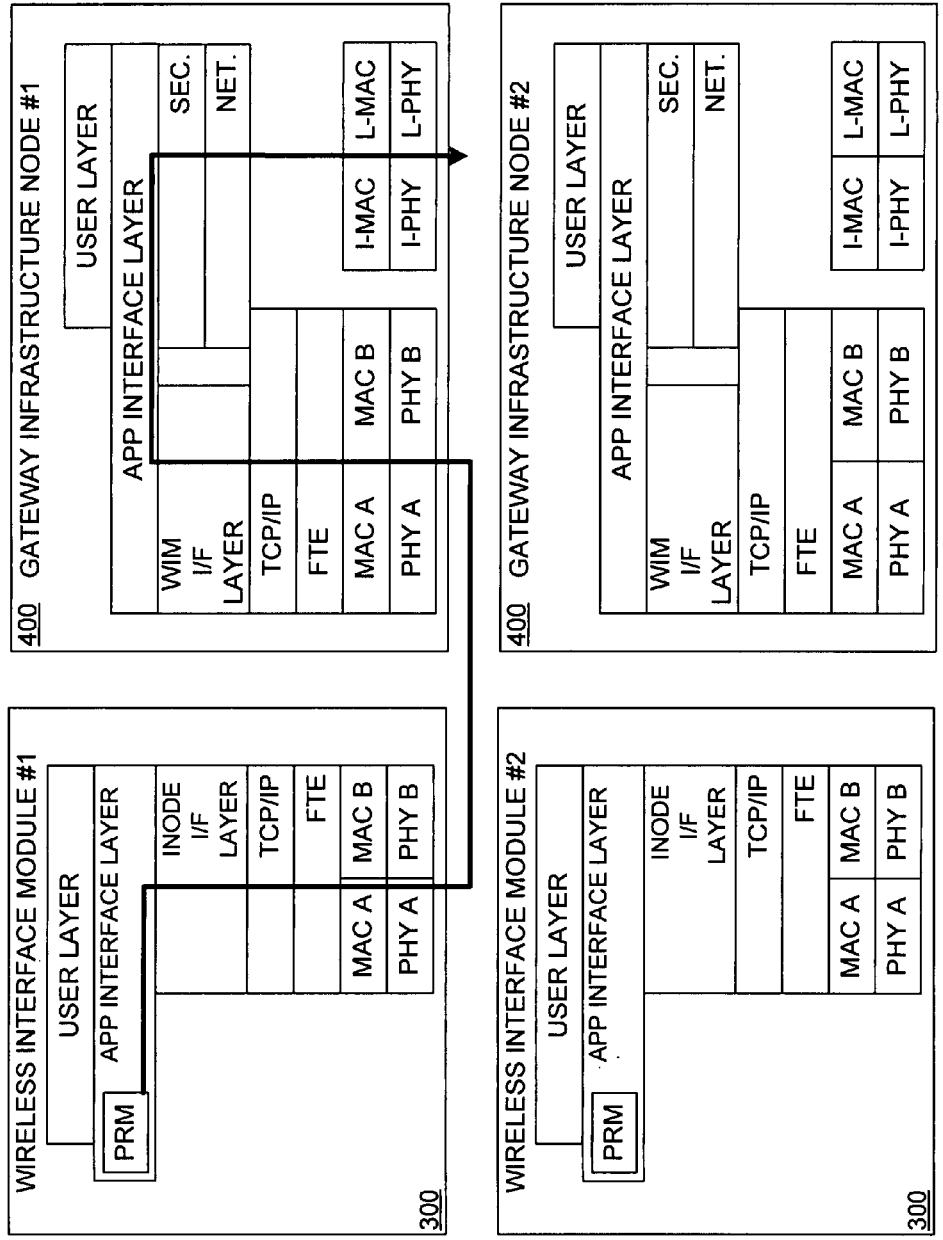
Figure 10:
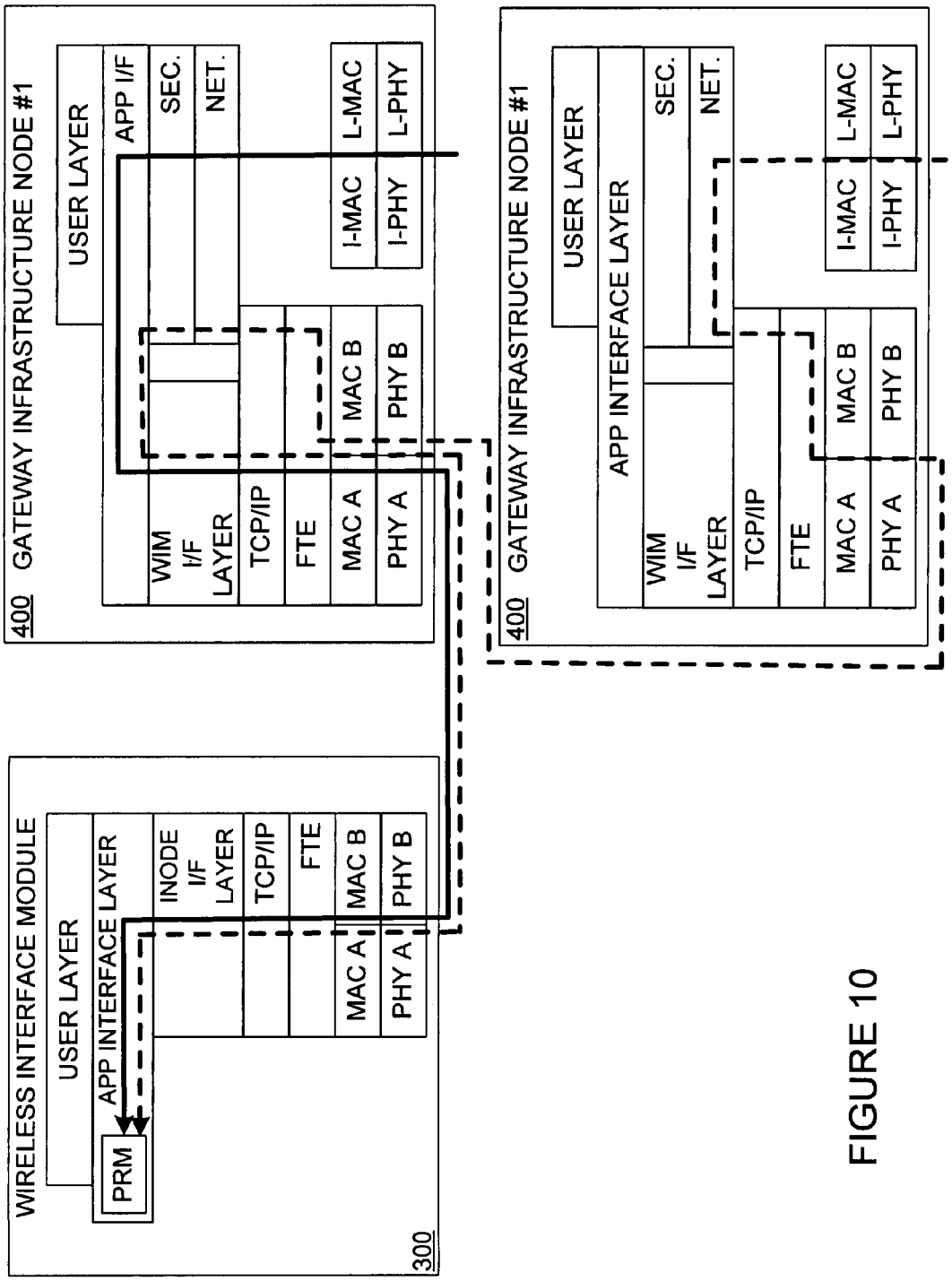
Figure 11:
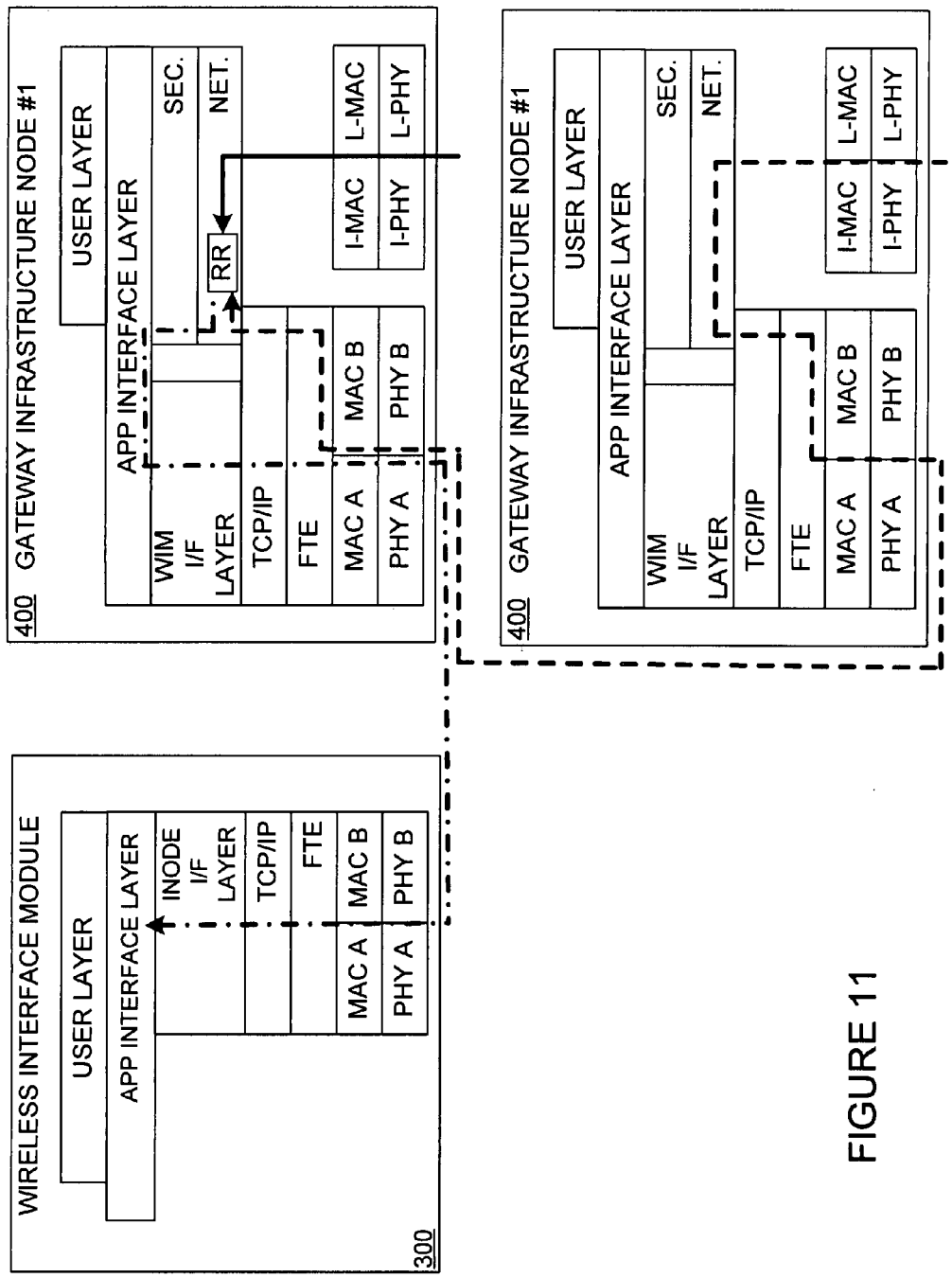

FIGS. 5 through 11 illustrate example communications in an industrial control and automation system according to this disclosure. In particular, FIG. 5 illustrates generic communication paths involving the wireless interface module 114 and the gateway infrastructure node 112. FIGS. 6 through 10 illustrate example communications that may occur involving the path redundancy manager 316 in the wireless interface module 114. FIG. 11 illustrates example communications that may occur involving the redundancy resolver 424 in the gateway infrastructure node 112. These example communications are provided for illustration and explanation only. Other communications could occur in the industrial control and automation system involving the various components shown in FIGS. 5 through 11 without departing from the scope of this disclosure.

In FIG. 5, generic communication paths involving a wireless interface module 114 and a gateway infrastructure node 112 are shown. In particular, FIG. 5 illustrates the generic communication paths involving the protocol stack 300 of the wireless interface module 114 and the protocol stack 400 of the gateway infrastructure node 112. In this example, the protocol stack 300 of the wireless interface module 114 supports a communication path 502 involving the gateway infrastructure node 112. For example, data can be sent along the communication path 502 to the gateway infrastructure node 112, and data can be received over the communication path 502 from the gateway infrastructure node 112. In this example, the communication path 502 traverses the physical, MAC, FTE, TCP/IP, and infrastructure node interface layers in the protocol stack 300 to reach the application interface layer of the protocol stack 300.

As shown in FIG. 5, the protocol stack 400 of the gateway infrastructure node 112 supports various communication paths 504-510. The communication paths 504-506 can be used, for example, to transport information between the infrastructure and leaf nodes and the wireless interface module 114. For example, data can be sent and received over the communication path 504 to and from the wireless interface module 114. The communication path 504 traverses the physical, MAC, FTE, TCP/IP, and WIM interface layers in the protocol stack 400 to reach the application interface layer of the protocol stack 400. Also, data can be exchanged with the infrastructure nodes 108a-108e or leaf nodes 110a-110f along the communication path 506. The communication path 506 traverses the physical, MAC, network, and security layers in the protocol stack 400 to reach the application interface layer of the protocol stack 400.

The communication paths 508-510 can be used, for example, to transport information between the infrastructure and leaf nodes and the key server 206. For example, data can be sent and received over the communication path 508 to and from the key server 206. The communication path 508 traverses the physical, MAC, FTE, and TCP/IP layers in the protocol stack 400. Also, data can be exchanged with the infrastructure nodes 108a-108e or leaf nodes 110a-110f along the communication path 510. The communication path 510 traverses the physical, MAC, and network layers in the protocol stack 400.

Using these generic communication paths, various examples of redundancy management are shown in FIGS. 6 through 11. The wireless interface modules 114a-114b and the gateway infrastructure nodes 112a-112b are represented in these figures using their protocol stacks 300 and 400, respectively.

Figure 6:
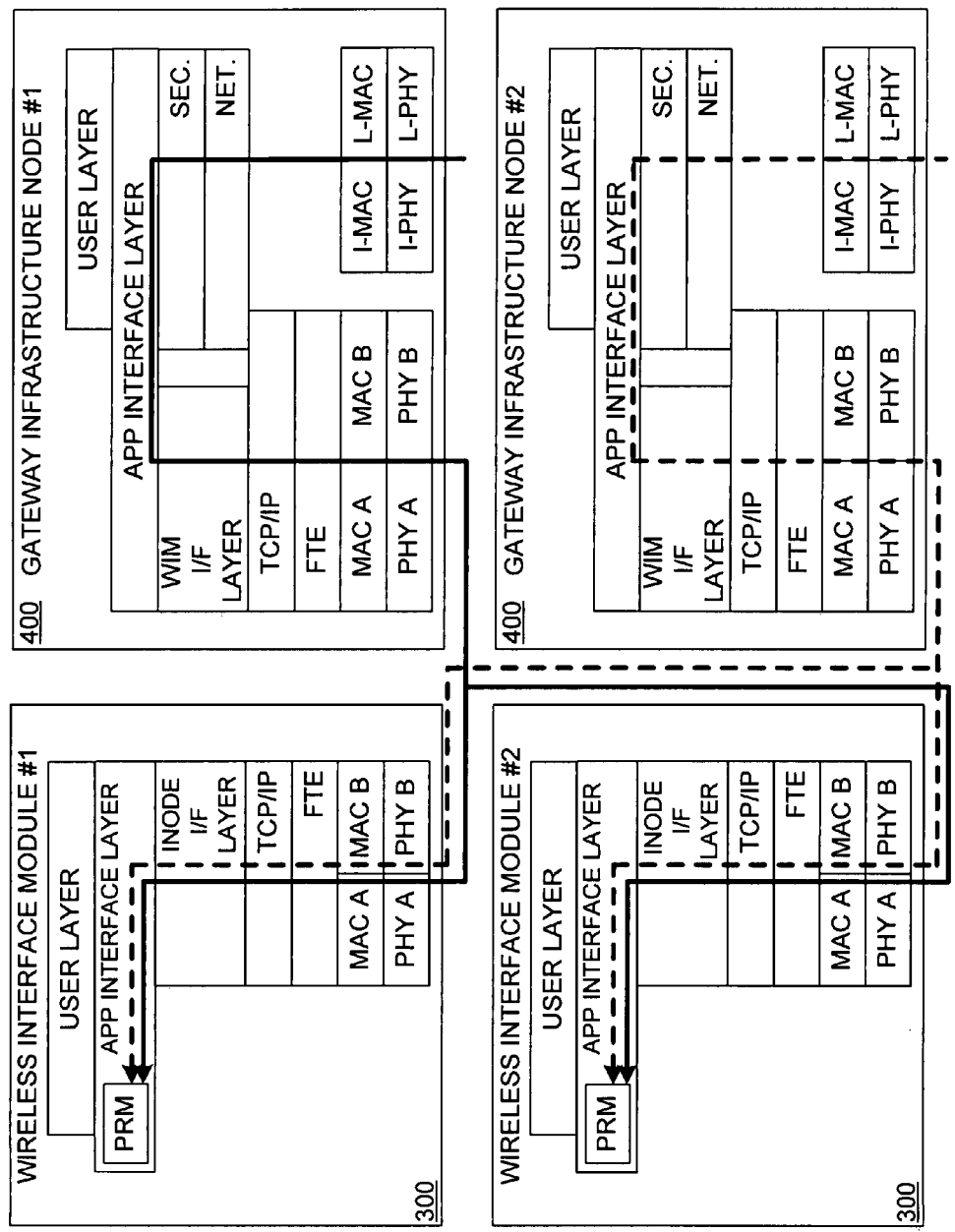

FIG. 6 represents example communications that may occur during the transmission of a latency-controlled class of data messages transmitted by a leaf node. In this example, the data messages in the latency-controlled class are provided redundant, non-overlapping, latency-controlled routing service from the transmitting leaf node to a redundant pair of wireless interface modules 114a-114b.

As shown in FIG. 6, the transmitting leaf node transmits a single data message (such as a single RF packet), which is received by redundant gateway infrastructure nodes 112a-112b. Each of the gateway infrastructure nodes 112a-112b processes the received data message and forwards it over an FTE/dual Ethernet network to both wireless interface modules 114a-114b. In this way, the gateway infrastructure nodes 112a-112b need not know which wireless interface module 114a-114b is currently acting as the primary WIM and which is currently acting as the backup WIM. As a result, each wireless interface module 114a-114b receives two copies of the data message from different gateway infrastructure nodes 112a-112b.

The path redundancy managers 316 in the wireless interface modules 114a-114b receive and identify the messages as copies. The path redundancy manager 316 in the primary wireless interface module 114a-114b can then forward a single copy of the data message over the network 106 for delivery. The path redundancy manager 316 in the backup wireless interface module 114a-114b need not perform any forwarding. In this example, the path redundancy managers 316 in the wireless interface modules 114a-114b help to conceal the redundancy mechanism (the redundant routing of data messages from a transmitting leaf node and the resulting data message copies) used within the wireless network.

Figure 7:
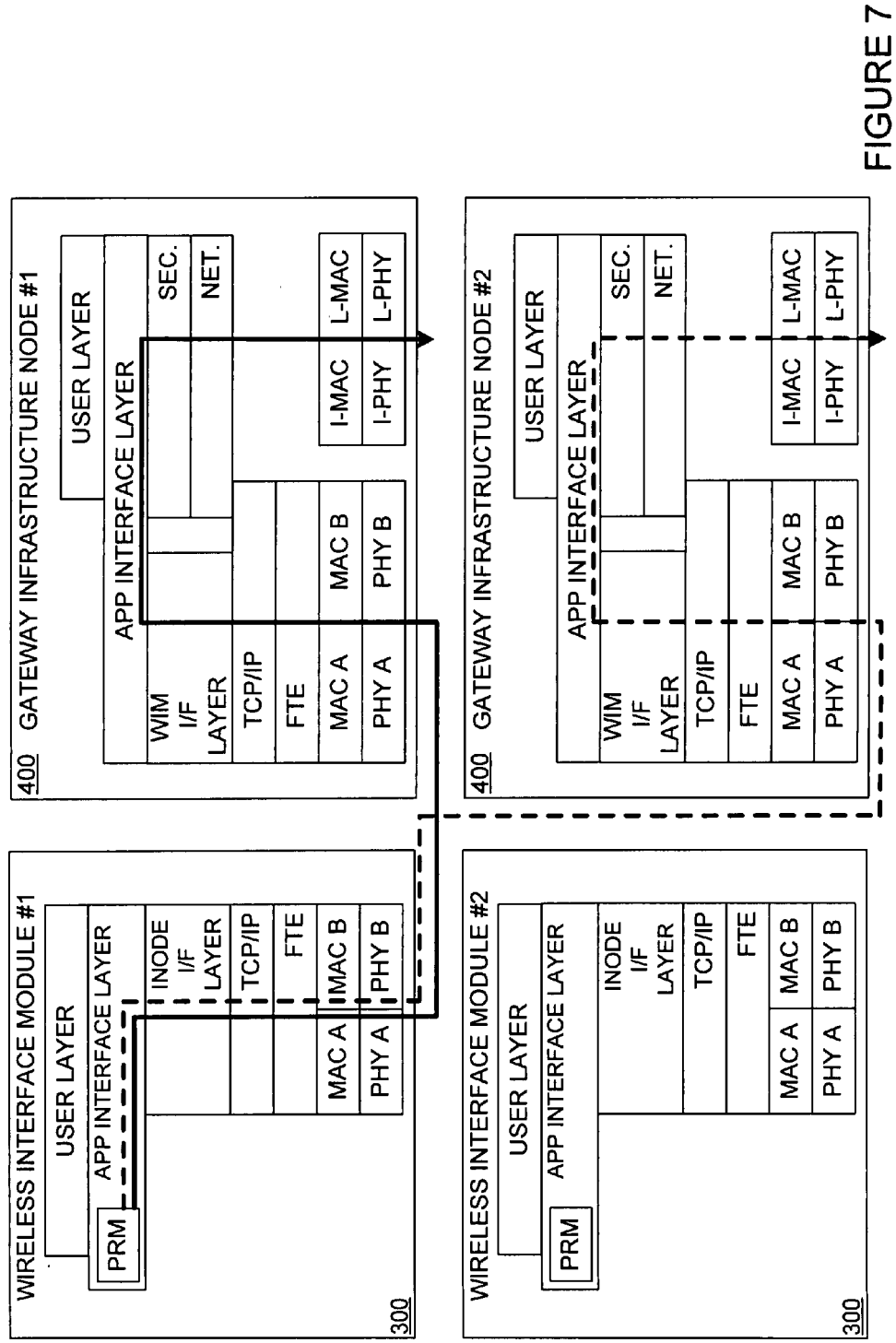

FIG. 7 represents example communications that may occur during the transmission of a latency-controlled class of data messages transmitted to a leaf node. In this example, the data messages in the latency-controlled class are provided redundant, non-overlapping, latency-controlled routing service from a wireless interface module 114a-114b to a receiving leaf node.

As shown in FIG. 7, one of the wireless interface modules 114a-114b receives a single data message to be sent to a leaf node. The path redundancy manager 316 in the wireless interface module sends copies of the data message to multiple gateway infrastructure nodes 112a-112b over an FTE/dual Ethernet network.

Each of the gateway infrastructure nodes 112a-112b then sends its copy of the data message to the intended leaf node. For example, the gateway infrastructure nodes 112a-112b can transmit RF packets to primary and secondary infrastructure nodes 108a-108e associated with the intended leaf node 110a-110f. In particular embodiments, the primary infrastructure node associated with the intended leaf node sends the RF packet to the leaf node, and the secondary infrastructure node associated with the intended leaf node sends an acknowledgement to the leaf node's acknowledgement. Also, in particular embodiments, the primary and secondary infrastructure nodes associated with the intended leaf node store each latency-controlled data message until the next latency-controlled data message is received.

Again, in this example, the path redundancy manager 316 in the wireless interface module helps to conceal the redundancy mechanism (namely, the redundant routing of multiple data message copies to a receiving leaf node) used within the wireless network.

Figure 8:
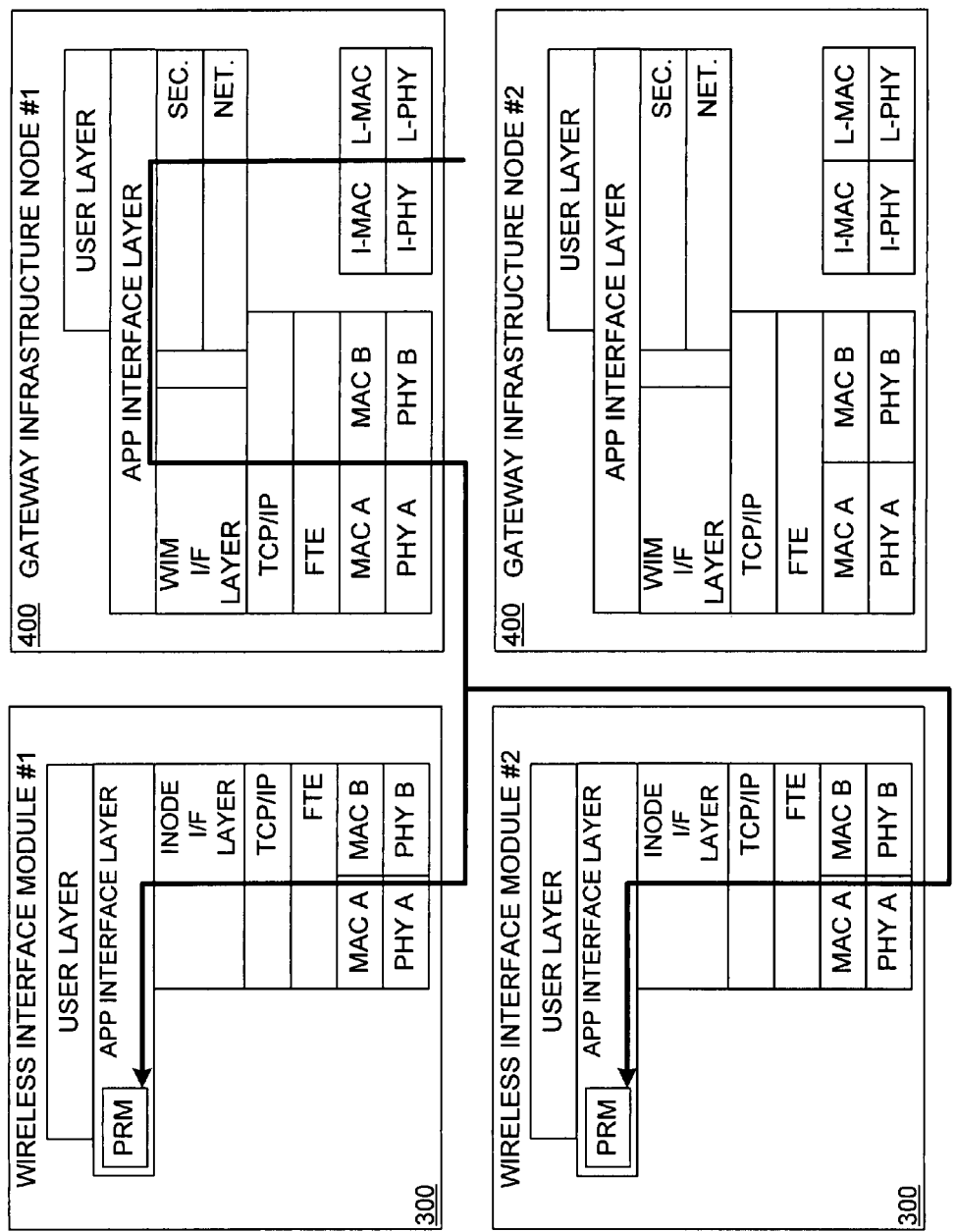

FIG. 8 represents example communications that may occur during the transmission of a non-latency-controlled class of data messages from a leaf node. In this example, the data messages in the non-latency-controlled class are provided non-redundant (but with hot backup), best effort automatic repeat request (ARQ) routing service from the transmitting leaf node to the wireless interface modules 114a-114b.

As shown in FIG. 8, the transmitting leaf node transmits a single data message, which is received by one of the gateway infrastructure nodes 112a-112b. The leaf node can control which gateway infrastructure node receives its data message, such as by selecting whether to communicate with a primary or secondary infrastructure node 108a-108e (each of which could be associated with a different one of the gateway infrastructure nodes). The gateway infrastructure node forwards the received data message over an FTE/dual Ethernet network to multiple wireless interface modules 114a-114b, so the gateway infrastructure node need not know which wireless interface module 114a-114b is primary and which is backup. The path redundancy managers 316 in the wireless interface modules 114a-114b receive the data message, and the path redundancy manager 316 in the primary wireless interface module 114a-114b can then forward the data message over the network 106 for delivery. In particular embodiments, the path redundancy managers 316 in the wireless interface module 114a-114b can support both ARQ and route selection.

FIG. 9 represents example communications that may occur during the transmission of a non-latency-controlled class of data messages to a leaf node. In this example, the data messages in the non-latency-controlled class are provided non-redundant (but with hot backup), best effort automatic repeat request (ARQ) routing service from a single one of the wireless interface modules 114a-114b through a single one of the gateway infrastructure nodes 112a-112b to a receiving leaf node.

As shown in FIG. 9, a single data message is received by one of the wireless interface modules 114a-114b. The path manager 316 in the wireless interface module sends the data message to a single one of the gateway infrastructure nodes 112a-112b, which forwards the data message to an infrastructure node 108a-108e for delivery to the leaf node. The wireless interface module can control which of the gateway infrastructure nodes 112a-112b receives its data message, thereby enabling the wireless interface module to select which path is used to communicate with the receiving leaf node. In particular embodiments, the path redundancy manager 316 in the wireless interface module 114a-114b can support both ARQ and route selection.

FIG. 10 represents example communications that may occur during the transmission of data messages from a leaf node. In this example, all copies of the data message are routed through a single one of the gateway infrastructure nodes 112a-112b (node 112a) to one or more of the wireless interface modules 114a-114b. Also, in this example, the other gateway infrastructure node 112b routes its copy of the data message to the gateway infrastructure node 112a, which forwards it to one or more of the wireless interface modules 114a-114b. The path redundancy manager 316 in one of the wireless interface modules 114a-114b receives the copies of the data message and forwards a single copy over the network 106 for delivery. In particular embodiments, the network and security layers 420-422 in the gateway infrastructure node 112a forwards all tested packets to the upper application interface layer 412, and the security layers 422 in the gateway infrastructure nodes 112a-112b maintain synchronization with one another.

FIG. 11 represents example communications that may occur during the transmission of data messages from a leaf node. In this example, the data messages are provided redundant routing service from the transmitting leaf node through the gateway infrastructure nodes 112a-112b to the redundancy resolver 424 in one of the gateway infrastructure nodes 112a-112b.

As shown in FIG. 11, the transmitting leaf node transmits a single data message, which is received by both of the gateway infrastructure nodes 112a-112b. In this example, the redundancy resolver 424 in the gateway infrastructure node 112a receives one copy of the data message via the wireless network layers in the gateway infrastructure node 112a. The redundancy resolver 424 in the gateway infrastructure node 112a also receives another copy of the data message from the other gateway infrastructure node 112b (via the wired network layers in the gateway infrastructure node 112a). The redundancy resolver 424 in the gateway infrastructure node 112a then forwards a single copy of the data message to one or more wireless interface modules 114a-114b. In particular embodiments, the security layers 422 in the gateway infrastructure nodes 112a-112b maintain synchronization with one another.

In this way, as with the path redundancy managers 316, the redundancy resolvers 424 in the gateway infrastructure nodes 112a-112b can help to conceal the redundancy mechanism (namely, the redundant routing of data messages and the resulting multiple data message copies) used within the wireless network. The redundancy resolvers 424 also help to conceal the redundancy mechanism from higher layers within the gateway infrastructure nodes 112a-112b.

Although FIGS. 5 through 11 illustrate examples of the communications in an industrial control and automation system, various changes may be made to FIGS. 5 through 11. For example, the communications shown in these figures represent only some of the communications that could occur in an industrial control and automation or other system. Any other or additional communications could occur in the system.

Figure 12:
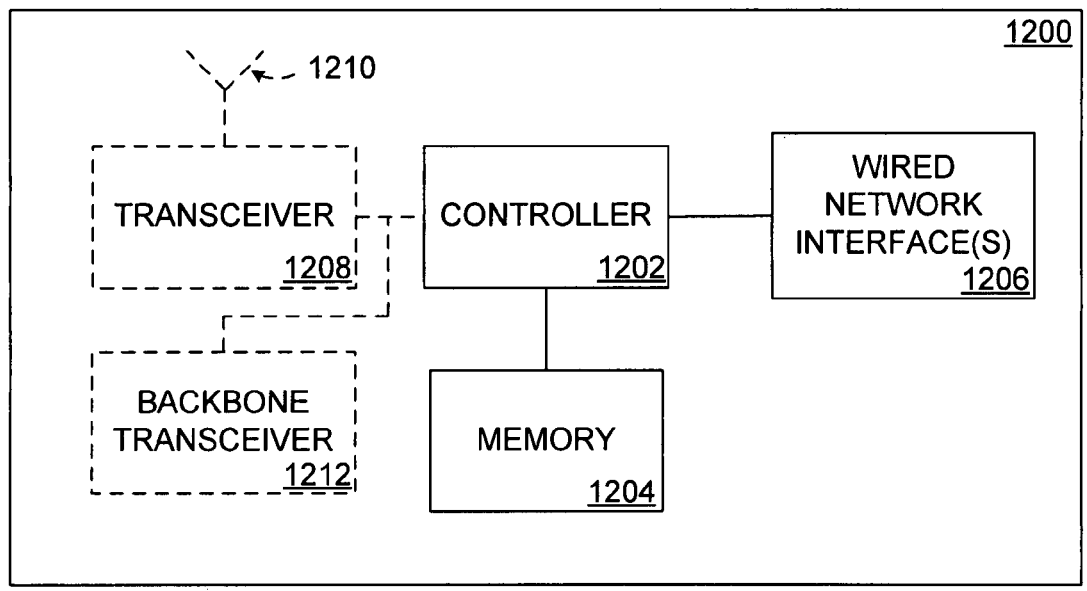
FIG. 12 illustrates an example device implementing a wireless interface module or gateway infrastructure node in an industrial control and automation system according to this disclosure.

FIG. 12 illustrates an example device 1200 implementing a wireless interface module or gateway infrastructure node in an industrial control and automation system according to this disclosure. The embodiment of the device 1200 shown in FIG. 12 is for illustration only. Other embodiments of the device 1200 could be used without departing from the scope of this disclosure.

As shown in FIG. 12, the device 1200 includes a controller 1202. The controller 1202 controls the overall operation of the device 1200. For example, the controller 1202 may receive or generate data to be transmitted externally, and the controller 1202 could provide the data to one or more other components in the device 1200 for transmission over a wired or wireless network. The controller 1202 could also receive data over the wired or wireless network and use the data. As a particular example, the controller 1202 in a wireless interface module 114 could receive data from a gateway infrastructure node 112 and provide the data for communication over the network 106. As another particular example, the controller 1202 in a gateway infrastructure node 112 could receive data from a wireless interface module 114 and provide the data for wireless communication to an infrastructure or leaf node. In addition, the controller 1202 could perform functions to conceal redundancy mechanisms in one network from another network, such as by implementing the path redundancy manager 316 or the redundancy resolver 424. The controller 1202 includes any suitable hardware, software, firmware, or combination thereof for controlling operation of the device 1200. As particular examples, the controller 1202 could represent a processor, microprocessor, microcontroller, field programmable gate array (FPGA), or other processing or control device.

A memory 1204 is coupled to the controller 1202. The memory 1204 stores any of a wide variety of information used, collected, or generated by the device 1200. For example, the memory 1204 could store information received over one network that is to be transmitted over another network. The memory 1204 includes any suitable volatile and/or non-volatile storage and retrieval device or devices.

The device 1200 also includes one or more wired network interfaces 1206. The wired network interfaces 1206 allow the device 1200 to communicate over one or more wired networks, such as the network 106. If the device 1200 represents a gateway infrastructure node 112, one or multiple wired network interfaces 1206 may allow the gateway infrastructure node 112 to communicate with one or more wireless interface modules 114 over a wired network. If the device 1200 represents a wireless interface module 114, one or multiple wired network interfaces 1206 may allow the wireless interface module 114 to communicate with one or more gateway infrastructure nodes 112 and other components (such as wired control system components) over a wired network. Each of the wired network interfaces 1206 includes any suitable structure for transmitting and/or receiving signals over a wired network.

If the device 1200 represents a gateway infrastructure node 112, the device 1200 may further include one or more wireless transceivers 1208. Each transceiver 1208 facilitates wireless communications to and from the device 1200. For example, a transceiver 1208 could receive a baseband or intermediate data signal and modulate the signal onto a carrier signal for transmission by an antenna 1210. The transceiver 1208 could also receive a carrier signal from the antenna 1210 and down-convert the signal into a baseband or intermediate signal. The one or more transceivers 1208 could thereby facilitate communication between the gateway infrastructure node 112 and one or more wireless devices, such as infrastructure or leaf nodes. Each transceiver 1208 includes any suitable structure for transmitting and/or receiving wireless signals. In some embodiments, each transceiver 1208 represents a radio frequency (RF) transceiver, and each antenna 1210 represents an RF antenna. The one or more transceivers 1208 could each use any other suitable wireless signals to communicate. Also, each transceiver 1208 could be replaced by a transmitter and a separate receiver.

Although FIG. 12 illustrates one example of a device 1200 implementing a wireless interface module or gateway infrastructure node in an industrial control and automation system, various changes may be made to FIG. 12. For example, various components in FIG. 12 could be combined or omitted or additional components could be added according to particular needs.

Figure 13:
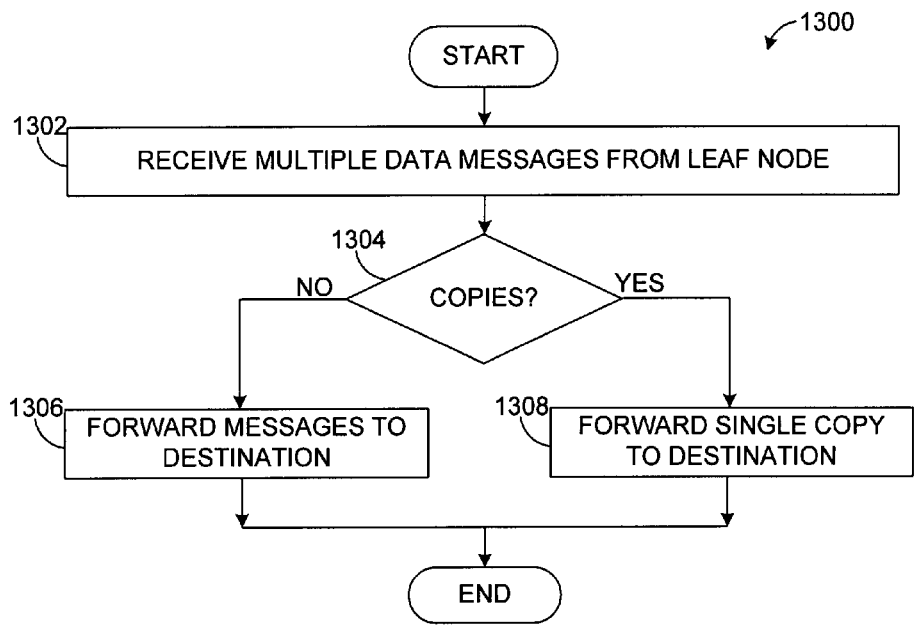
FIGS. 13 and 14 illustrate example methods for concealing redundant wireless communications in an industrial control and automation system according to this disclosure.
Figure 14:
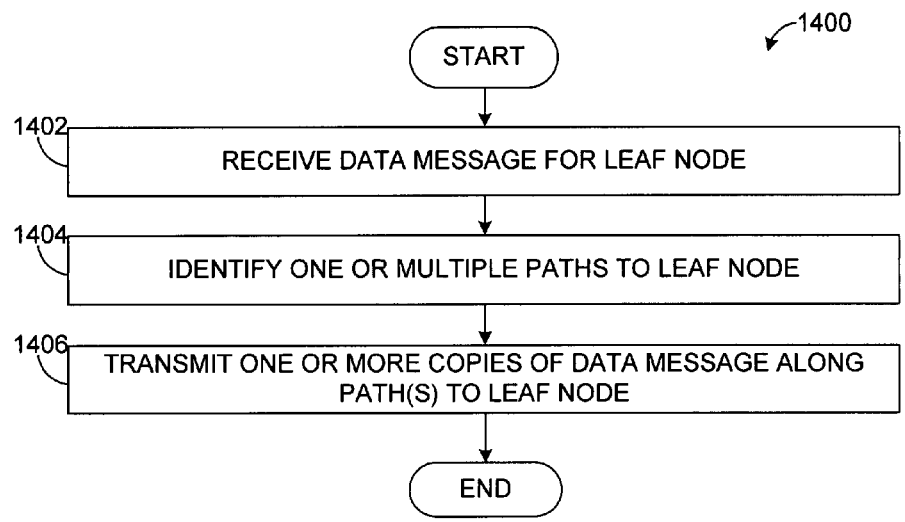

FIGS. 13 and 14 illustrate example methods for concealing redundant wireless communications in an industrial control and automation system according to this disclosure. In particular, FIGS. 13 and 14 illustrate example methods for concealing redundant communications in one network from another network in an industrial control and automation system. The embodiments of the methods shown in FIGS. 13 and 14 are for illustration only. Other embodiments of the methods may be used without departing from the scope of this disclosure.

In FIG. 13, a wireless interface module or gateway infrastructure node receives multiple data messages from a leaf node at step 1302. This may include, for example, a path redundancy manager 316 in a wireless interface module 114 receiving data messages from different gateway infrastructure nodes 112a-112b. This may also include a redundancy resolver 424 in one gateway infrastructure node 112a receiving multiple data messages from the leaf node, one from the leaf node itself (possibly via one or more infrastructure nodes 108a-108e) and another from a different gateway infrastructure node 112b.

The wireless interface module or gateway infrastructure node determines if the received messages are copies at step 1304. This may include, for example, the path redundancy manager 316 or redundancy resolver 424 examining the headers or contents of the data messages to determine if the messages are copies.

If not, the multiple messages are forwarded to one or more appropriate destinations at step 1306. In this case, the path redundancy manager 316 or redundancy resolver 424 need not take any action to conceal redundancy mechanisms in one network from another network.

Otherwise, if the messages are copies, a single copy of the data message is forwarded to the appropriate destination at step 1308. In this case, the path redundancy manager 316 or redundancy resolver 424 takes action to conceal the redundant paths (and the resulting redundant messages) that exist in the wireless network. At this point, the method 1300 ends. The entire method 1300 could then be repeated to process additional messages from a leaf node.

In FIG. 14, a wireless interface module or gateway infrastructure node receives a data message for a leaf node at step 1402. This may include, for example, a path redundancy manager 316 in a wireless interface module 114 receiving a data message over a network 106. This may also include a redundancy resolver 424 in one gateway infrastructure node 112a receiving a data message from a wireless interface module 114.

The wireless interface module or gateway infrastructure node identifies one or multiple paths to a destination leaf node at step 1404. This could include, for example, the path redundancy manager 316 in the wireless interface module 114 identifying one or more gateway infrastructure nodes that should receive and transmit the data message. This could also include the redundancy resolver 424 in one gateway infrastructure node 112a identifying another gateway infrastructure node 112b that should receive and transmit the data message.

The wireless interface module or gateway infrastructure node communicates one or more copies of the data message along the identified path(s) to the leaf node at step 1406. This could include, for example, the path redundancy manager 316 in the wireless interface module 114 transmitting copies of the data message to multiple gateway infrastructure nodes 112a-112b for forwarding to the leaf node (possibly via one or more infrastructure nodes). This could also include the redundancy resolver 424 in one gateway infrastructure node 112a forwarding a copy of the data message to the leaf node (possibly via one or more infrastructure nodes) and forwarding another copy of the data message to the other gateway infrastructure node 112b for delivery to the leaf node.

Using the methods 1300 and 1400 shown in FIGS. 13 and 14, the path redundancy manager 316 and/or the redundancy resolver 424 can help to mask the redundant communication paths (and the resulting redundant copies of messages) present in the wireless network. For example, the path redundancy manager 316 and/or the redundancy resolver 424 can help to ensure that only a single copy of a data message from a leaf node is forwarded to a destination in a wired control system. Similarly, the path redundancy manager 316 and/or the redundancy resolver 424 can help to ensure that multiple copies of a data message received from the wired control system are sent to a leaf node, increasing the likelihood that the data message is successfully received.

Although FIGS. 13 and 14 illustrate examples of methods for concealing redundant wireless communications in an industrial control and automation system, various changes may be made to FIGS. 13 and 14. For example, while shown as a series of steps, various steps in each figure could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A method comprising:
   receiving a plurality of first data messages, the first data messages transmitted over multiple first paths in a wireless network;
   determining if two or more of the first data messages are copies;
   when two or more of the first data messages are copies, communicating a single one of the two or more first data messages over a wired network;
   receiving a second data message associated with a first class;
   communicating multiple copies of the second data message for transmission over the wireless network to a single destination;
   receiving a third data message associated with a second class; and
   communicating a single copy of the third data message for transmission to the single destination over the wireless network.

2. The method of claim 1, further comprising:
   identifying multiple second paths for the multiple copies of the second data message to the single destination.

3. The method of claim 1, wherein the wireless network comprises:
- gateway infrastructure nodes receiving the first data messages directly or indirectly from one or more leaf nodes; and
- wireless interface modules receiving at least some of the first data messages from the gateway infrastructure nodes;
- wherein the gateway infrastructure nodes and the wireless interface modules are coupled to the wired network.

4. The method of claim 3, wherein the receiving, determining, and communicating steps are performed by at least one of the wireless interface modules.

5. A method comprising:
- receiving a plurality of data messages, the data messages transmitted over multiple paths in a wireless network;
- determining if two or more of the data messages are copies; and
- when two or more of the data messages are copies, communicating a single one of the two or more data messages over a wired network;
- wherein the wireless network comprises:
  - gateway infrastructure nodes receiving the data messages directly or indirectly from one or more leaf nodes; and
  - wireless interface modules receiving at least some of the data messages from the gateway infrastructure nodes;
- wherein the gateway infrastructure nodes and the wireless interface modules are coupled to the wired network;
- wherein receiving the plurality of data messages comprises, at each of the wireless interface modules, receiving the data messages from multiple ones of the gateway infrastructure nodes; and
- wherein communicating the single one of the two or more data messages over the wired network is performed by one of the wireless interface modules.

6. The method of claim 3, wherein the receiving, determining, and communicating steps are performed by at least one of the gateway infrastructure nodes.

7. A method comprising:
- receiving a plurality of data messages, messages transmitted over multiple paths in a wireless network;
- determining if two or more of the data messages are copies; and
- when two or more of the data messages are copies, communicating a single one of the two or more data messages over a wired network;
- wherein the wireless network comprises:
  - gateway infrastructure nodes receiving the data messages directly or indirectly from one or more leaf nodes; and
  - wireless interface modules receiving at least some of the data messages from the gateway infrastructure nodes;
- wherein the gateway infrastructure nodes and the wireless interface modules are coupled to the wired network;
- wherein receiving the plurality of data messages comprises, at a first of the gateway infrastructure nodes, receiving the data messages from one or more of the leaf nodes and a second of the gateway infrastructure nodes; and
- wherein communicating the single one of the two or more data messages over the wired network is performed by the first gateway infrastructure node.

8. The method of claim 1, wherein the wireless network comprises a network of wireless sensors and actuators in an industrial control and automation system, the industrial control and automation system associated with an industrial process.

9. An apparatus comprising:
- at least one interface configured to communicate over at least a wired network; and
- a controller configured to:
  - receive a plurality of first data messages that are transmitted over multiple first paths in a wireless network;
  - determine if two or more of the first data messages are copies;
  - when two or more of the first data messages are copies, provide a single one of the two or more first data messages to the at least one interface for transmission over the wired network;
  - receive a second data message associated with a first class;
  - cause multiple copies of the second data message to be transmitted over the wireless network to a single destination;
  - receive a third data message associated with a second class; and
  - cause a single copy of the third data message to be transmitted over the wireless network to the single destination.

10. The apparatus of claim 9, wherein the controller is further configured to identify multiple second paths for the multiple copies of the second data message to the single destination.

11. The apparatus of claim 9, wherein the wireless network comprises:
- gateway infrastructure nodes configured to receive the first data messages directly or indirectly from one or more leaf nodes; and
- wireless interface modules configured to receive at least some of the first data messages from the gateway infrastructure nodes;
- wherein the gateway infrastructure nodes and the wireless interface modules are coupled to the wired network.

12. The apparatus of claim 11, wherein the apparatus comprises one of the wireless interface modules.

13. An apparatus comprising:
- at least one interface configured to communicate over at least a wired network; and
- a controller configured to:
  - receive a plurality of data messages that are transmitted over multiple paths in a wireless network;
  - determine if two or more of the data messages are copies; and
  - when two or more of the data messages are copies, provide a single one of two or more data messages to the at least one interface for transmission over the wired network
- wherein the apparatus comprises a wireless interface module;
- wherein the controller is configured to receive the plurality of data messages from multiple gateway infrastructure nodes that are configured to receive the data messages directly or indirectly from one or more leaf nodes; and
- wherein the at least one interface is configured to communicate with the gateway infrastructure nodes.

14. The apparatus of claim 11, wherein the apparatus comprises one of the gateway infrastructure nodes.

15. An apparatus comprising:
- at least one interface configured to communicate over at least a wired network; and
- a controller configured to:

receive a plurality of data messages that are transmitted over multiple paths in a wireless network;

determine if two or more of the data messages are copies; and when two or more of the data messages are copies, provide a single one of two or more data messages to the at least one interface for transmission over the wired network;

wherein the apparatus comprises a first gateway infrastructure node;

wherein the controller is configured to receive the plurality of data messages from one or more leaf nodes and a second gateway infrastructure node; and wherein the at least one interface is configured to communicate with the second gateway infrastructure node and one or more wireless interface modules.

16. The apparatus of claim 9, wherein:

the wireless network comprises a network of wireless sensors and actuators in an industrial control and automation system, the industrial control and automation system associated with an industrial process; and the at least one interface is configured to communicate over multiple wired networks in the industrial control and automation system.

17. A non-transitory computer readable medium comprising a computer program, the computer program comprising computer readable program code for:

receiving a plurality of first data messages, the first data messages transmitted over multiple first paths in a wireless network;

determining if two or more of the first data messages are copies;

when two or more of the first data messages are copies, initiating communication of a single one of the two or more first data messages over a wired network;

receiving a second data message associated with a first class;

initiating communication of multiple copies of the second data message for transmission over the wireless network to a single destination;

receiving a third data message associated with a second class; and initiating communication of a single copy of the third data message for transmission to the single destination over the wireless network.

18. The non-transitory computer readable medium of claim 17, wherein the wireless network comprises:

gateway infrastructure nodes configured to receive the first data messages directly or indirectly from one or more leaf nodes; and wireless interface modules configured to receive at least some of the first data messages from the gateway infrastructure nodes.

19. The non-transitory computer readable medium of claim 18, wherein:

the computer readable program code for receiving the plurality of first data messages comprises computer readable program code for, at a first of the wireless interface modules, receiving the first data messages from multiple ones of the gateway infrastructure nodes; and the computer readable program code for initiating communication of the single one of the two or more first data messages over the wired network comprises computer readable program code for initiating communication, from the first wireless interface module, of the single one of the two or more first data messages over the wired network.

20. The non-transitory computer readable medium of claim 18, wherein:

the computer readable program code for receiving the plurality of first data messages comprises computer readable program code for, at a first of the gateway infrastructure nodes, receiving the first data messages from one or more of the leaf nodes and a second of the gateway infrastructure nodes; and the computer readable program, code for initiating communication of the single one of the two or more first data messages over the wired network comprises computer readable program code for initiating communication, from the first gateway infrastructure node, of the single one of the two or more first data messages over the wired network.

21. The non-transitory computer readable medium of claim 17, further comprising computer readable program code for:

identifying multiple second paths for the multiple copies of the second data message to the single destination.

* * * * *